United States Patent [19]

Goodson et al.

[11] 4,219,878

[45] Aug. 26, 1980

[54] SPEED MEASURING DEVICE

[75] Inventors: William D. Goodson; John R. Alden, both of Chanute; David L. Hyder, Overland Park, all of Kans.

[73] Assignee: Kastom Electronics, Inc., Shawnee Mission, Kans.

[21] Appl. No.: 896,373

[22] Filed: Apr. 14, 1978

[51] Int. Cl.² .............................................. G01P 3/66
[52] U.S. Cl. ................................... 364/565; 364/438; 324/178; 340/38 R
[58] Field of Search ................ 364/565, 438; 324/187, 324/160, 166, 172; 346/18; 340/38 R; 235/92 TC

[56] References Cited

U.S. PATENT DOCUMENTS

| 3,218,553 | 11/1965 | Peterson et al. | 324/187 |
| 3,492,570 | 1/1970 | Tanzman | 364/565 |
| 3,530,382 | 9/1970 | Liston et al. | 364/438 |
| 3,611,134 | 10/1971 | McDowell | 324/187 |
| 4,031,510 | 6/1977 | King | 340/38 R |

Primary Examiner—Charles E. Atkinson
Assistant Examiner—Gary Chin
Attorney, Agent, or Firm—Lowe, Kokjer, Kircher, Wharton & Bowman

[57] ABSTRACT

A special accessory for traffic radar devices includes two operating routines. These routines are to be used with a programmable microprocessor which comprises a portion of the traffic radar device. The routines are designated as a stopwatch routine and an interrupt routine. The stopwatch routine controls the overall operation of the speed computation within the programmable microprocessor of the traffic radar device while the interrupt request routine causes the microprocessor to perform as a precision clock capable of measuring elapsed time.

19 Claims, 4 Drawing Figures

SPEED MEASURING DEVICE

BACKGROUND AND BRIEF DESCRIPTION OF THE INVENTION

This invention relates in general to a computing scheme for performing non-radar speed computations in digital radar units having central processing systems comprised of microprocessors. In particular, the computing scheme of the present invention uses the microprocessor of a digital radar unit to automatically compute the speed of a moving vehicle in response to distance information manually provided to the unit and timing information derived in the microprocessor in response to activation and deactivation information manually inputted to the unit.

It is a well established principle of physics that the average speed of a vehicle can be calculated by simply dividing the distance traveled by the vehicle during a particular time interval by the time interval. Utilization of this basic principle by law enforcement officers to compute the speed of moving vehicles has taken many forms including the physical apparatus disclosed in the U.S. Pat. No. 3,276,029 issued to Marshall on Sept. 27, 1966 and entitled "Apparatus for Speed Indication". Typically, the law enforcement officer uses a stopwatch or some other timing device to measure the time it takes the vehicle to travel a known distance. The law enforcement officer then computes the speed of the vehicle by either manually dividing the known distance by the measured time or correlating this information on a chart designed for this purpose. This type of speed computation, however, is undesirable because it is slow and cumbersome to perform and is subject to inaccuracy due to device calibration and officer error.

The present invention, however, eliminates these manual operations and provides a reliable scheme for using the microprocessor of a digital radar unit to automatically perform this type of speed computation in response to information manually introduced to the radar unit. In other words, the computing scheme of the present invention represents an add on feature for digital radar units which include central processing units consisting of programmable microprocessors. An example of such a digital radar unit is disclosed in the commonly owned application for U.S. Letters Patent, Aker, et al. filed simultaneously on Apr. 14, 1978 and bearing Ser. No. 896,376 with this application and entitled "Traffic Radar Device". The teachings of that application are incorporated by reference herein.

The computing scheme of the present invention generally comprises two operating routines designated as the stopwatch routine and the interrupt request routine. The stopwatch routine controls the overall operation of the speed computation while the interrupt request routine causes the microprocessor to act as a precision clock which is capable of measuring elapsed time.

A digital radar unit incorporating the computing scheme of the present invention is arranged to be used in either the radar mode of operation or the non-radar mode of operation with the particular mode of operation being selected by the operator of the unit. To use the computing scheme of the present invention, the unit must be powered on, at this time the microprocessor detects that power is being applied and forces the unit to go into a calibration sequence where the displays are exercised, the time bases are checked against each other for accuracy, the stopwatch computation ability is verified and the thumbwheel switches can be manually tested if desired. Next, the digital radar unit must be placed in the non-radar mode of operation by placing an appropriate switch on the control panel of the unit in what is designated the stopwatch position. The known distance between two referece points is then programmed into the digital radar unit using thumbwheel switches. Thereafter, the law enforcement officer using the radar unit activates the speed computation by depressing the timing switch on the control panel of the radar unit as the vehicle being monitored passes the first reference point. Upon depression of the timing switch, the digital radar unit acts as a precision clock which produces an accurate reading of elapsed time. As the monitored vehicle passes the second reference point, the officer once again depresses the timing switch causing the radar unit to terminate the timing operation and initiate the speed calculation and calibration sequence. The radar unit then scales the speed computation to provide a measurement of speed in terms of miles per hour, kilometers per hour or any other programmed unit of measurement. The speed measurement is then displayed by the radar unit.

Depression of the timing button a third time blanks the radar displays and places the radar unit in condition to perform a second speed computation. Additional features of the present invention include provision of an error indication if a set maximum time period is exceeded or a selected maximum speed is surpassed.

It is therefore an object of the present invention to provide a computing scheme for using a digital radar unit to compute the speed of a moving vehicle in a non-radar manner. This unit would have the ability to be easily changed to allow the display of speed information in various units of measure.

Another object of the present invention is to provide a scheme whereby the unit would automatically check the accuracy of its own system time base prior to displaying any speed information.

Another object of the present invention is to provide a scheme for computing the speed of a moving vehicle in a digital radar unit having a programmable microprocessor in response to information manually inputted to the unit.

A further object of the present invention is to provide a computing scheme which provides added flexibility to a digital radar unit by allowing the radar unit to compute the speed of a moving vehicle in response to information manually inputted to the unit.

It is a further object of the present invention to provide a computing scheme which initiates and terminates the speed computing operating in response to depression of a single timing switch.

Other and further objects of this invention, together with the features of novelty appurtenant thereto, will appear in the course of the following description.

DETAILED DESCRIPTION OF THE INVENTION

In the accompanying drawings, which form a part of the specification and are to be read in conjunction therewith and which like reference numerals are employed to indicate like parts in the various views.

Figure 1:
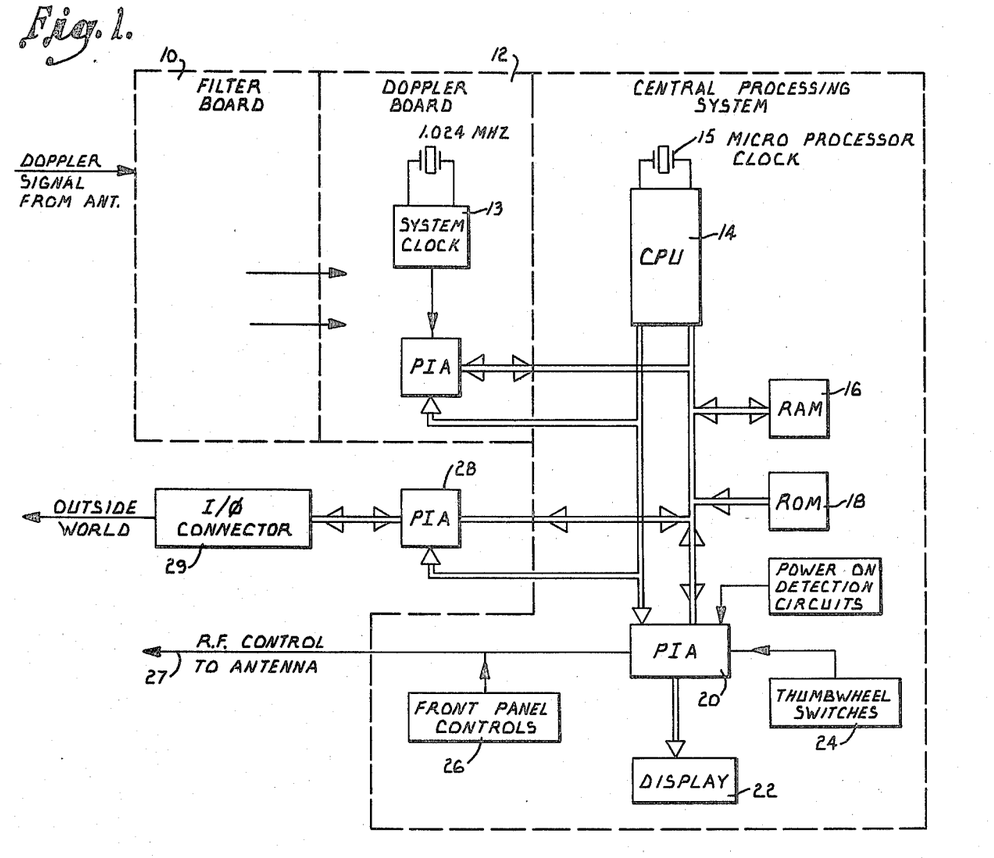
FIG. 1 is a block diagram of a digital radar unit which has a central processing system comprised of a programmable microprocessor.

The computing scheme of the present invention is arranged to be used in combination with digital radar units which have central processing units consisting of programmable microprocessors. A block diagram of such a radar unit is shown in FIG. 1. The block diagram of FIG. 1 is a schematic illustration of the digital radar unit described in the commonly owned application for U.S. patent by Aker, et al, filed simultaneously on Apr. 14, 1978 and bearing Ser. No. 896,376 with this application and entitled "Traffic Radar Detector". The teachings of that application are incorporated herein by reference.

Referring now to FIG. 1, the block diagram of a digital radar unit is shown in this figure. This digital radar unit includes a filter board 10 which is not germane to the present discussion because it is only used by the radar when it is operating in the radar mode.

The digital radar unit also includes a central processing unit 14 comprising a programmable microprocessor such as a MC6800/MOS Microprocessor manufactured by Motorola. A system clock 13 located on the doppler board 12 is used to generate system timing. Shown also are the components associated with a typical microprocessor system such as a microprocessor clock 15 used to operate the microprocessor and to allow a calibration check on the system clock, a random access memory 16 and read only memory 18 for program storage and execution of instructions to the system. A peripheral interface adapter (PIA) 20 is provided to interface the central processing system with a display circuit 22, a group of thumb wheel switches generally designated by the numeral 24, a control panel 26 and an RF control line 27 used to turn the RF off when the radar is operating non-radar in the mode. The display circuit 22 is capable of displaying both the speed and timing information computed by the radar unit in the non-radar mode of operation. The thumb wheel switches 24 are used to provide distance information to the radar unit in the non-radar mode. Control panel 26 is used to select the operating mode of the radar unit and includes a switch for selecting either the radar or non-radar mode of operation and a push-button timing switch for initiating and terminating the speed computation. A second PIA 28 is used to interface the microprocessor to an input/output port 29 which is used to externally activate the various operations performed by the microprocessor or allow the microprocessor to output information to an external device. For a more detailed description of these components and the interaction between them see the Aker patent application entitled "Traffic Radar Detector" and filed simultaneously with this application on Apr. 14, 1978 and bearing Ser. No. 896,376.

The computing scheme of the present invention is comprised of two routines which can be programmed into digital radar units having central processing systems comprising programmable microprocessors. These two routines are designated the stopwatch routine and the interrupt request routine. The stopwatch routine controls the non-radar speed computation including activation and termination of the timing cycle and resetting of the radar unit following a speed computation. The interrupt request routine, on the other hand, provides a precision clock which is capable of accurately measuring elapsed time.

In operation, the mode selection button is placed in the non-radar (stopwatch) position causing the microprocessor to access the computing scheme of the present invention. The law enforcement officer using the radar unit then selects two stationary reference points which are clearly visible from his vantage point. The distance between the two points is then measured (if not previously measured) and programmed into the radar unit by setting the distance on the thumb wheel switches 24. Distance is programmed into the radar unit in terms of yards or meters and the radar unit is programmed to provide the speed measurement in terms of miles per hour, knots, kilometers per hour or any other preprogrammed unit of measure. Thereafter, the law enforcement officer waits until the vehicle to be monitored passes the first reference point. As the vehicle passes this reference point, the officer depresses the timing switch on the control panel causing the speed computation to be initiated. Initiation of the speed computation in this manner causes the radar unit to operate as a precise clock which provides an accurate measurement of elapsed time.

As the monitored vehicle passes the second reference point, the officer once again depresses the timing switch causing the timing operation to be terminated, the speed of the monitored vehicle to be calculated and the accuracy of the time base to be verified. The radar unit calculates the speed of the vehicle by dividing the distance programmed on the thumb wheel switches by the elapsed time. The result is then scaled and displayed in terms of the preselected unit of measure. The radar unit is also capable of displaying the elapsed time and of providing an error indication if the measured time reaches a preselected maximum, the calculated speed is too large for display or the time base is not within preselected limits. Upon noting the displayed results, the officer then depresses the timing switch a third time causing the display to be cleared and the unit to be reset thereby putting it in condition to make another speed computation.

The computing scheme of the present invention is initiated by placing the selection switch on the control panel in the non-radar or stopwatch position. Upon selection of the non-radar mode of operation, the central processing system immediately goes to the stopwatch routine of the present invention. The flow chart for this routine is shown in FIG. 2.

Figure 2:
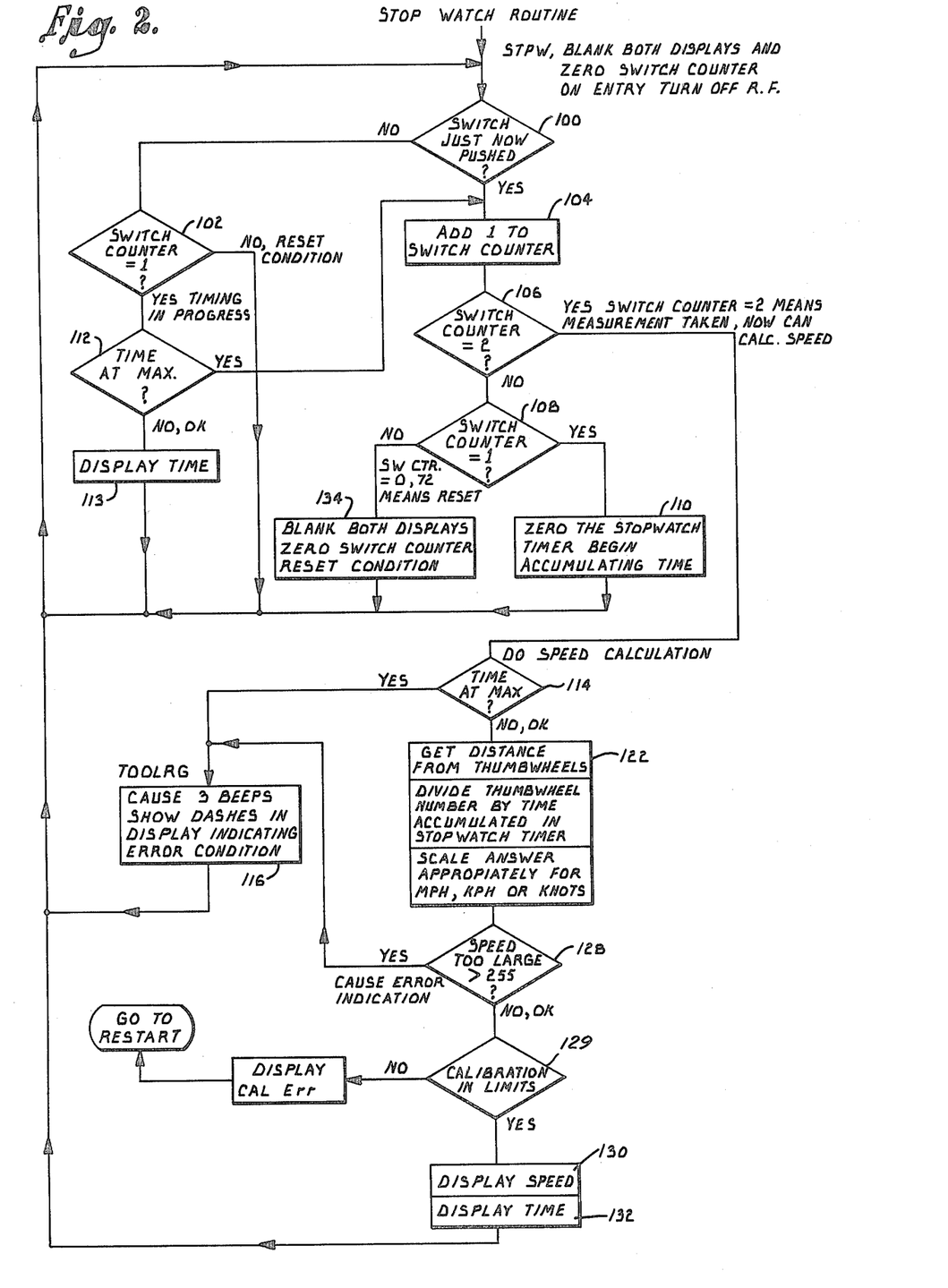
FIG. 2 is a flow chart of the stopwatch routine operations.

As shown in FIG. 2, entry to this routine causes the central processing unit to blank the speed and time displays and to zero a counter referred to as the switch counter. The purpose of the switch counter is to record the number of times the timing switch has been depressed to thereby control the computing operation of the present invention.

The routine then determines if the timing switch has been depressed. Performance of this operation is represented by decision block 100. The stopwatch routine incorporates decision making functions which allow it to determine whether or not the timing switch has been depressed or has been depressed and is being held down. Depression of the timing switch automatically triggers a positive response within this decision block. If the timing switch has been depressed, the program takes the Yes branch out of the decision block 100. If the timing switch has not been depressed, the program takes the No branch causing the count state of the switch counter to be checked in decision block 102. The program then takes the "No" branch out of this decision block if the count state of the switch counter is not equal to one and the "Yes" branch is this count state of the counter is equal to one.

Upon entry of this routine, the switch counter is automatically zeroed and the count state of this counter is not subsequently incremented until the timing switch is depressed. Since the routine has just been entered and the timing switch has not yet been depressed, the count state of the switch counter is equal to zero and, the program takes the "No" branch out of decision block 102 causing the program to return to its entry point. The program continues to circulate within this loop until the decision block 100 indicates that the timing switch has been depressed.

Upon depression of the timing switch, the routine follows the "Yes" path out of decision block 100 causing the count state of the switch counter to be incremented by one as represented by block 104. The count state of the switch counter is then examined in decision blocks 106 and 108. Decision block 106 checks to see if the count state of the switch counter is equal to two. If it is, the program takes the "Yes" branch. The program, however, follows the "No" branch of the routine if the count state of the switch counter is not equal to two.

Following the initial depression of the timing switch, the count state of the switch counter is equal to one causing the program to take the "No" path out of decision block 106. The count state of the switch counter is then examined in decision block 108 to see if it is equal to one. A count state of one causes the timing operation to be initiated and returns the program to its entry point. The flow chart of the timing routine is shown in FIG. 2 and will be discussed in greater detail later. Briefly, however, initiation of the timing operation is symbolized by block 110 and causes the stopwatch timer to be zeroed and activated. In this way, the speed computing operation of the present invention is initiated upon the initial depression of the timing switch. As mentioned above, the law enforcement officer initially depressed the timing switch as the vehicle being monitored passes the first reference point.

The timing operation continues to run until the timing switch is depressed a second time or the time measurement reaches a preset maximum value. During this period, decision block 100 directs the program along the "No" branch of this block. The count state of the switch counter is then examined in decision block 102 to see if it is equal to one. At this time, the switch counter does, in fact, have a count state of one causing the program to follow the "Yes" path out of decision block 102. The time measurement is then examined as shown in decision block 112 to determine if a preselected maximum time has been obtained. If the maximum time has not been reached, the elapsed time is then displayed (as represented by block 113) and the program is returned to its entry point. The program continues to move through this loop until the timing switch is depressed or the time measurement reaches the preset maximum value. If the time measurement reaches the preset maximum value, the count state of the switch counter is incremented by one and the program takes the "Yes" path out of decision block 106. This "Yes" path directs the program to another decision block 114 where the time measurement is again checked to see if the maximum value has been obtained. In the case where the maximum value has been obtained, the program takes the "Yes" path out of decision 114 causing an error indication to be initiated. As depicted by block 116, this error indication consists of generating three audio beeps and displaying dashes in both the timing and speed displays. The program then continues to circulate through the path formed by decision block 100, the "No" path out of this block, decision block 102 and the "No" branch of this block until the timing switch is depressed a third time causing the error indication to be terminated and the program to be reset as will be described in detail later.

Figure 3:
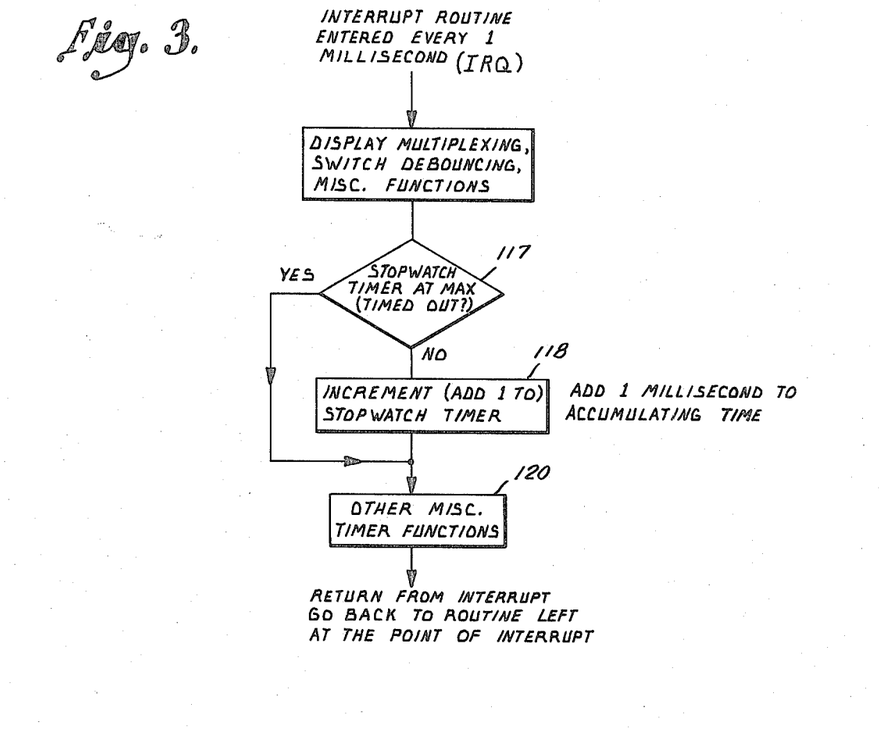
FIG. 3 is a flow chart of the interrupt request routine.

The timing operation (system clock) is performed by the interrupt request routine shown in FIG. 3. As shown in FIG. 3, the timing operation is accessed by the interrupt request routine (IRQ). The timing for this routine is generated by a 1.024 MHZ oscillator which is divided down by an integrated circuit counter to produce a square wave having a period of precisely one millisecond, discussed later.

This clock signal is provided to the microprocessor through a peripheral interface adapter (PIA 6820) such as the one shown in the above mentioned copending application. Reception of this input signal by the microprocessor causes an interrupt (IRQ interrupt) within the microprocessor on each falling edge of this one millisecond signal. This interrupt causes the microprocessor to stop whatever operation it is executing and effects execution of the interrupt request routine shown in FIG. 3. Upon completion of this routine the microprocessor returns to the operation it was previously performing.

As shown in FIG. 3, the interrupt request routine is fairly simple. In particular, this routine comprises initially performing some display multi-plexing routines, some switch *debouncing* and some other miscellaneous functions not pertinent to this disclosure. The routine also includes checking the count state of the stop watch timer as shown by decision block 117 and incrementing the stopwatch counter if it has not reached its maximum value (see block 118) or by-passing this operation if the maximum count state of the stopwatch counter has been obtained. After some miscellaneous timer functions are performed (as represented by block 120), this routine is exited and the microprocessor is allowed to return to its previous operation.

It should be pointed out at this time that the interrupt request routine is running continuously. In other words, the microprocessor runs through that routine every time a clock signal is received whether or not the timing operation is being reuqested by the stopwatch routine. The stopwatch counter is incremented each time the interrupt request routine is entered unless the maximum count state of this timer has already been obtained. Thereafter, the incrementing operation is bypassed and the stopwatch timer is retained at its maximum count state.

As mentioned above, the law enforcement officer depresses the timing switch a second time as the monitored car passes the second reference point. Upon depression of the timing switch a second time, the computing scheme of the present invention takes the Yes brance out of decision block 100 causing the count state of the switch counter to be incremented by 1. This incrementing process is represented by block 104. The count state of the switch counter is then examined in decision block 106 and the program is directed along the Yes path since the count state of the switch counter is now equal to two. A count state of two is the recognized condition required for initiating the speed calculation. Prior to the speed calculation, the value of the time measurement is checked as illustrated by decision block 114. In normal operation, the timing switch will be depressed a second time before the stopwatch counter reaches its maximum value. If the time measurement is below the maximum value, the program takes the No path out of decision block 114 causing the speed calculation to be initiated.

The microprocessor is now ready to perform the speed calculation as represented by block 122. The microprocessor performs the speed calculation by first acquiring the distance information programed into the radar unit via the thumb wheel switches. This information is provided to the microprocessor from the thumb wheel switches through a peripheral interface adaptor. The microprocessor then divides this distance information by the time measurement which has been accumulated by the stopwatch counter. The result is then scaled to provide a useable speed figure which is representative of miles per hour or kilometers per hour. The value of the speed measurement is then checked in decision block 128 to determine if it is within the displayable range. If the speed figure is greater than 255, an error indication is generated in block 116. This error indication consists of three audible tones and the display of dashes on the speed and timing displays. If the speed figure is less than 255, the microprocessor preforms a calibration check in block 129 where the relationship between the system time base 13 and microprocessor clock 15 are compared to determine if they are within a predefined limit.

The microprocessor clock is independent from the system time base, both of which in the present invention are crystal controlled. One of the features of this invention is the ability to check its calibration automatically by comparing one time base against the other. Prior to displaying a calculated speed, the microprocessor treates a hardware register within RAM 16 as a counter which is used to count the number of cycles around a program loop between IRQ interrupts. Since the processor cycle rate (and the number of instructions per second around the program loop) is determined by the microprocessor clock, and the IRQ rate of occurrance is determined by the system time base, the number in the counter in RAM 16 will not be its calculated value if either are in error. If this is found to occur, the unit will display "CAL ERR" instead of the violation speed.

Figure 1A:
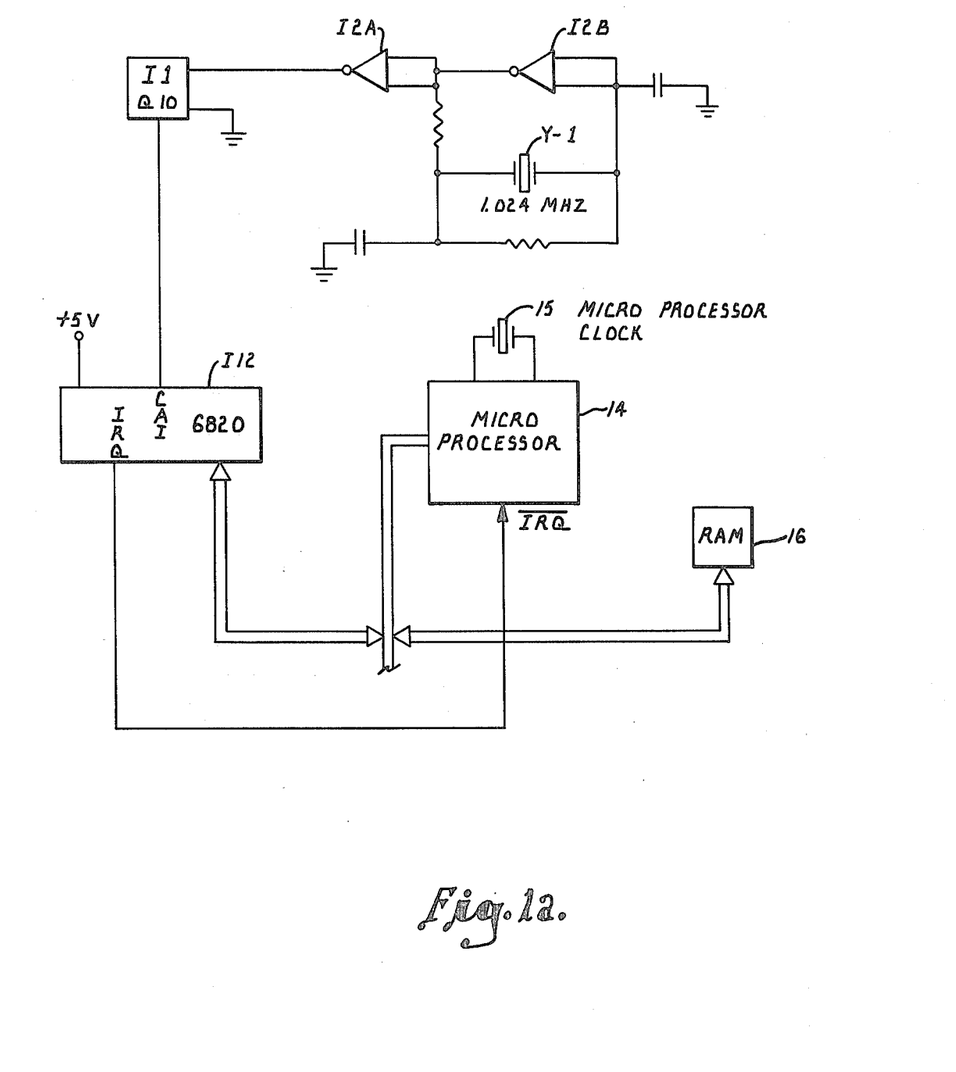
FIG. 1a is a circuit diagram of the system clock and the microprocessor clock.

The system time base is shown in FIG. 1a as the crystal Y1. Y1 is incorporated in an oscillator circuit operating at 1.024 mhz, the output of which is divided in I1 with the divided output of same, Q 10, being connected to CA-1 line of I 12. I 12 is programmed when the system is initialized by the initialization routine thereby defining CA-1 as an edge triggered interrupt line. Each time CA-1 has a transition thereon in the approriate polarity, I 12 will cause the $\overline{IRQ}$ line (FIG. 1a) to transition to the low state thus notifying the processor that a standard duration time interval has elapsed. The microprocessor (14) will then service this interrupt which interrupt occurs every one millisecond and is the master clock for the system.

If this limit is exceeded the No branch is taken to an error condition block 131 where a cal err message is displayed indicating to the operator that there has been a system abnormality. At this point the unit exits the stopwatch routine and enters the restart routine which causes the system to start over again in a restarted condition with the switch counter set to zero. If upon completing the calibration check the results are within the predefined limits, the speed figure and time measurement are then displayed as represented by blocks 130 and 132 respectively. The program is then returned to its entry point to await a reset request.

To reset the radar unit, the timing switch is depressed causing the count state of the switch counter to be incremented a third time. Since the switch counter now has a count state of three, the program takes the No path out of decision blocks 106 and 108 causing the radar unit to be reset in block 134. Block 134 causes the speed figure and time measurement displays to be blanked and the switch counter to be reset to zero before returning the computing scheme to its entry point. The radar is now in condition to perform another speed computation.

From the foregoing, it will be seen that this invention is one well adapted to attain all of the ends and objects herein set forth together with other advantages which are obvious and which are inherent to the structure.

It will be understood that certain features and subcombinations are of utility and may be employed without reference to other features and subcombinations. As many possible embodiments may be made of the invention without departing from the scope thereof, it is to be understood that all matters herein set forth or shown in the accompanying drawings is to be interpreted as illustrative and not in a limiting sense.

Having thus described my invention, we claim:

1. A speed measurement device for calculating and displaying the average speed of an object moving a distance between first and second location, the device comprising:
    means for generating a first time base;
    means for accumulating time interval information based on said first time base and occurring between a first event corresponding to said first location and a second event corresponding to said second location;
    means for supplying information corresponding to said distance between the two locations in appropriate units for calculation;
    means for calculating speed by dividing said distance information by said time interval information;
    means for displaying said calculated speed of said moving object;
    means for generating a second time base;
    means for comparing said first and second time bases for determining the existence of a predetermined relationship between them; and
    means for controlling the display means in accordance with said predetermined relationship.

2. The invention as in claim 1 including means for displaying said time interval.

3. The invention as in claim 1 including means for producing an error indication if said time interval reaches a preset maximum value.

4. The invention as in claim 1 wherein said calculating means includes scaling means for providing said speed measurement in a predetermined unit of measure.

5. The invention as in claim 1 including means for checking the magnitude of said calculated speed prior to display, said checking means being operable to inhibit display of said calculated speed and to provide an error indication if said calculated speed is above a preselected value.

6. The invention as in claim 1 wherein said accumulating means is switched of:

switch means having a normal condition and an increment condition, said switch means being normally biased toward said normal condition and operable to be manually moved from said normal condition to said increment condition;

counting means for recording the number of times said switch means is manually moved from said normal condition to said increment condition, said counting means being incremented by a certain amount each time said switch means is manually moved from said normal condition to said increment condition;

means for effectuating activation of said means for generating a first time base whenever said counting means obtains a count state representative of one incremental increase;

means for causing deactivation of said means for generating a first time base whenever said counting means obtains a count state representative of two incremental increases.

7. The invention as in claim 6 including means for blanking said speed measurement display means and for resetting said counting means whenever said counting means obtains a count state representative of three incremental increases.

8. In a doppler radar device capable of determining the speed of a moving vehicle, the combination therewith of:

means for manually entering distance information of a distance measurement;

timing means for measuring elasped time between events to thereby provide a time measurement;

switch means having a normal condition and an increment condition, said switch means being normally biased toward said normal condition and operable to be manually moved from said normal condition to said increment condition;

counting means for recording the number of times said switch means is manually moved from said normal condition to said increment condition, said counting means being incremented by a prescribed amount each time said switch means is manually moved from said normal condition to said increment condition;

means for effectuating activation of said timing means whenever said counting means obtains a count state representative of one incremental increase;

means for causing deactivation of said timing means whenever said counting means obtains a count state representative of two incremental increases;

means for converting said distance and time measurements into a speed measurement upon deactivation of said timing means; and means for displaying said speed measurement;

timing calibration check circuit connected to said converting means for controlling the display of said speed measurement in said display means in response to said timing calibration check circuit.

9. The invention as in claim 8 wherein said timing calibration check circuit comprises:

means for generating a first time base;
means for generating a second time base;
means for comprising said first and second time bases for determining a predetermined relationship therebetween;
means for controlling the display means in accordance with said predetermined relationship; and further including
means for displaying said time measurement.

10. The invention as in claim 8 wherein said timing calibration check circuit comprises:

means for generating a first time base;
means for generating a second time base;
means for comparing said first and second time bases for determining a predetermined relationship therebetween;
means for controlling the display means in accordance with said predetermined relationship; and further including
means for producing an error indication if said timing means reaches a preset maximum value.

11. The invention as in claim 8, wherein said timing calibration check circuit comprises:

means for generating a first time base;
means for generating a second time base;
means for comparing said first and second time bases for determining a predetermined relationship therebetween;
means for controlling the display means in accordance with said predetermined relationship; and further including
means for blanking said speed measurement display means and for resetting said counting means whenever said counting means obtains a count state representative of three incremental increases.

12. The combination as in claim 8 wherein said timing calibration check circuit comprises means for generating a first time base;
means for generating a second time base;
means for comparing said first and second time bases for determining a predetermined relationship therebetween;
means for controlling the display means in accordance with said predetermined relationship; and further including
scaling means for providing said speed measurement in any predetermined unit of measure.

13. The invention as in claim 8 wherein said timing calibration check circuit comprises:

means for generating a first time base;
means for generating a second time base;
means for comparing said first and second time bases for determining a predetermined relationship therebetween;
means for controlling the display means in accordance with said predetermined relationship; and further including
means for checking the magnitude of said speed measurement prior to display, said checking means being operable to inhibit display of said speed measurement and to provide an error indication if said speed measurement is above a preselected value.

14. The invention as in claim 8 wherein said timing calibration check circuit comprises:

means for generating a first time base;
means for generating a second time base;
means for comparing said first and second time bases for determining a predetermined relationship therebetween;
means for controlling the display means in accordance with said predetermined relationship; and further including
means for resetting said timing means to zero prior to activation of said timing means.

15. The method for calculating and displaying the average speed of an object moving between a first and a second location, the method comprising the steps of:

generating a first time base;

accumulating a time interval based on said first time base and occurring between a first event corresponding to said first location and a second event corresponding to said second location;

determining the distance between said two locations in appropriate units for calculation;

calculating speed by dividing said distance by said time interval;

generating a second time base;

comparing said first and second time bases to determine if a predetermined relationship exists between them, and displaying said calculated speed if said predetermined relationship between said first and second time bases exists.

16. The method as in claim 15 including the step of displaying said time interval.

17. The method as in claim 15 including the step of producing an error indication if said time interval reaches a preset maximum value.

18. The method as in claim 15 including the step of scaling said calculated speed prior to display to provide said speed measurement in the predetermined unit of measure.

19. The method as in claim 15 including steps of:

checking the magnitude of said calculated speed prior to display, inhibiting display of said calculated speed if said calculated speed exceeds a preselected maximum value, and generating an error indication if said calculated speed exceeds said preselected maximum value.

* * * * *